Feb. 3, 1942. C. R. HALL 2,271,609
FLAGSTAFF
Filed Sept. 25, 1941 2 Sheets-Sheet 1

Inventor
Charles R. Hall
Attorney

Feb. 3, 1942.    C. R. HALL    2,271,609
FLAGSTAFF
Filed Sept. 25, 1941    2 Sheets-Sheet 2
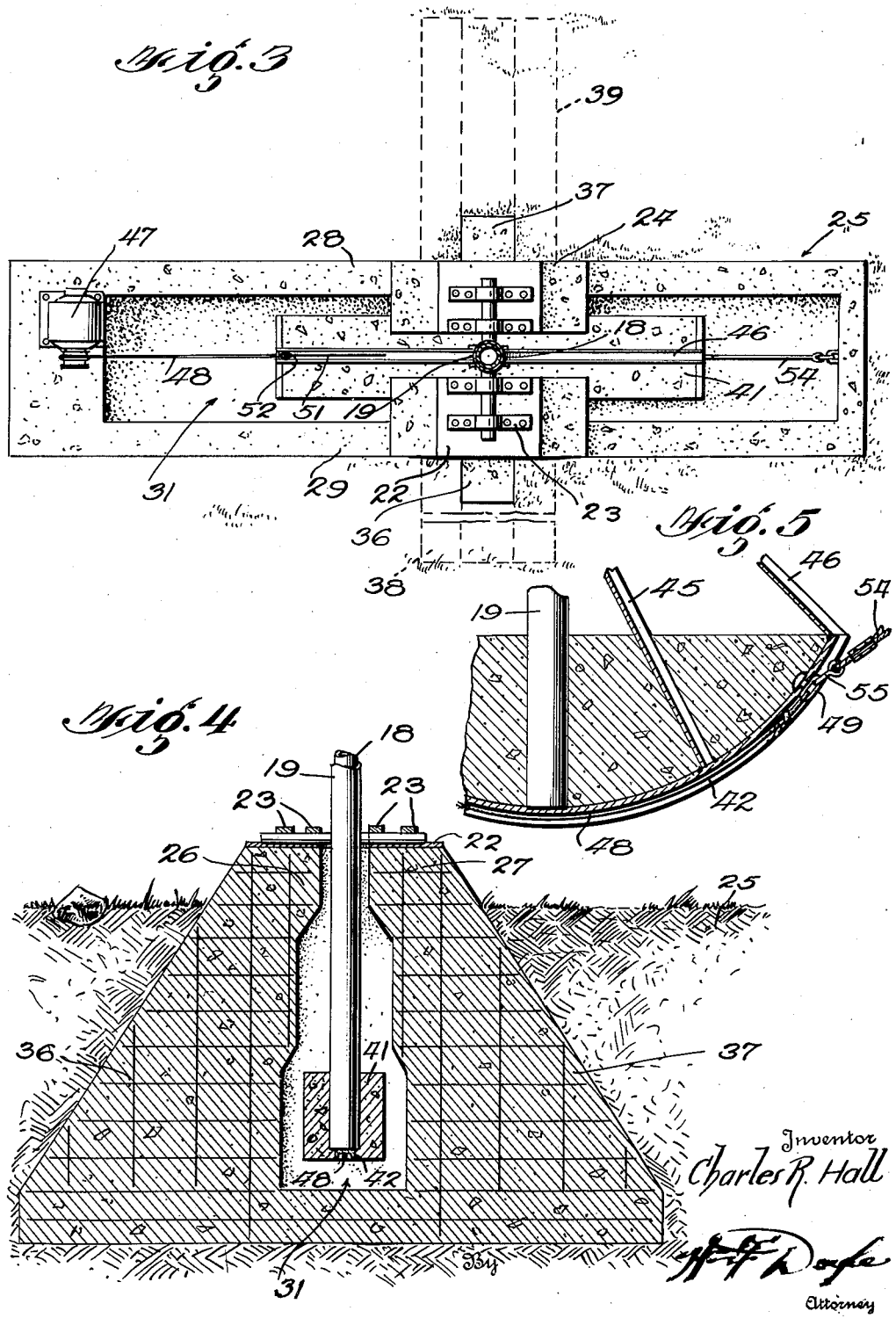
Inventor
Charles R. Hall
Attorney Patented Feb. 3, 1942

2,271,609

UNITED STATES PATENT OFFICE 2,271,609

FLAGSTAFF

Charles R. Hall, United States Army

Application September 25, 1941, Serial No. 412,223

6 Claims. (Cl. 116—173)

(Granted under the act of March 3, 1883, as amended April 30, 1928; 370 O. G. 757)

The invention described herein, if patented, may be manufactured and used by or for the Government for governmental purposes without the payment of any royalty thereon.

The present invention relates to flagpoles and more specifically to a novel mechanical design for a large flagstaff suitable for Army camps, etc., pivoted at the base to permit it to be lowered to a horizontal position.

One of the objects of the invention is the provision of a novel and improved mechanical design whereby a large flagstaff may be constructed of materials commonly available in any community, as contrasted with materials requiring special design or special fabrication.

Another object of the invention is to provide a pivotal mounting for a flagstaff and simplified power mechanism to raise or lower the staff by swinging it about the pivot.

A further object of the invention is to provide a novel laminated construction for the flagstaff whereby the portions of the staff ordinarily subjected to the greatest stress may be protected against mechanical failure.

A further object of the invention is to provide a novel flagstaff mounting comprising a pair of longitudinal, spaced-apart, foundation walls adapted to support a trunnion on which the staff is mounted, and provided with side buttresses to form, in effect, a four-way foundation arranged to resist thrusts in any direction.

Before discussing in detail the preferred embodiment of the invention, illustrated in the drawings, it is believed pertinent to point out that it is recognized as a fact that the prior art discloses many types of sectional flagstaffs, some of which are provided with pivotal mountings whereby they may be shifted from vertical to horizontal position for repairs or for painting.

It is believed to be desirable to point out, however, that in the prior art it has never been regarded as a practical undertaking to attempt to provide such a flagstaff in large sizes as, for example, in heights of 100 feet and over, for several reasons.

In the first place, it has heretofore been regarded as essential in the construction of large flagstaffs to utilize materials of special fabrication, particularly steel tubes or cast-iron pipes having unusually thick wall sections whereby the strength necessary adjacent the base of the poles might be obtained. In this connection, it has always been recognized that an ordinary commercial pipe could be satisfactorily used for a small flagstaff, but so far as is known to this applicant such a construction has never been regarded as practical on flagstaffs of considerable height since the normal wall thickness of normal pipe is relatively small in pipe diameters of above five inches, and any attempt to construct a suitable flagstaff has resulted in a dangerously weak and unsafe structure.

Consequently, it has always been regarded as an impractical undertaking to attempt to provide a pivotal mounting for a large staff, since the segmental gears customarily used for pivoted shafts must of necessity be formed so large as to become objectionable by reason of their appearance. Further, it will be appreciated that gears or similar mechanism of this description are not available on the open market and may be obtained only by special fabrication.

These difficulties are overcome by the teaching of the present invention, by the novel design and construction of the flagstaff illustrated in the drawings, wherein the staff proper is formed of a number of individual sections of standard iron pipe telescoped each within the other according to a novel arrangement to be described more fully hereinafter, such that the upper extremity of the flagpole consists of a single thickness of pipe wall and the lower extremity of the staff is also formed of a single thickness of pipe wall but wherein the intermediate section of the staff, including the section adjacent the trunnion mounting, is formed of a plurality of thicknesses of pipe to provide, in effect, a laminated flagstaff construction.

In practicing the principles of this invention, the difficulties incident to the provision of or use of a large segmental gear, for example, are alleviated by providing a relatively large concrete counterweight at the bottom of the staff and arranged to include an arcuate lower surface with the cable of an electric winch arranged around the arcuate surface to facilitate raising and lowering the staff.

In the preferred embodiment of the invention the counterweight is partially concealed by the walls of the pit. This is accomplished by mounting the trunnion on which the flagstaff is pivoted at a point substantially above the level of the surrounding terrain and constructing the foundation of the staff in such a manner as to include a pit below the surface of the terrain in which the counterweight is normally concealed when the staff is in vertical position. Further, the weight is completely concealed by metal or concrete covers (not shown).

Referring now more particularly to the drawings included in and forming a part of this specification.

Fig. 3 is a plan sectional view of the flagstaff foundation and counterweight pit.

Fig. 4 is a sectional elevational view through the flagstaff foundation taken substantially on the plane of the line 4—4 in Fig. 1.

Fig. 5 is a central detail sectional view of a fragmental portion of the flagstaff counterweight.

Figures 1, 2:
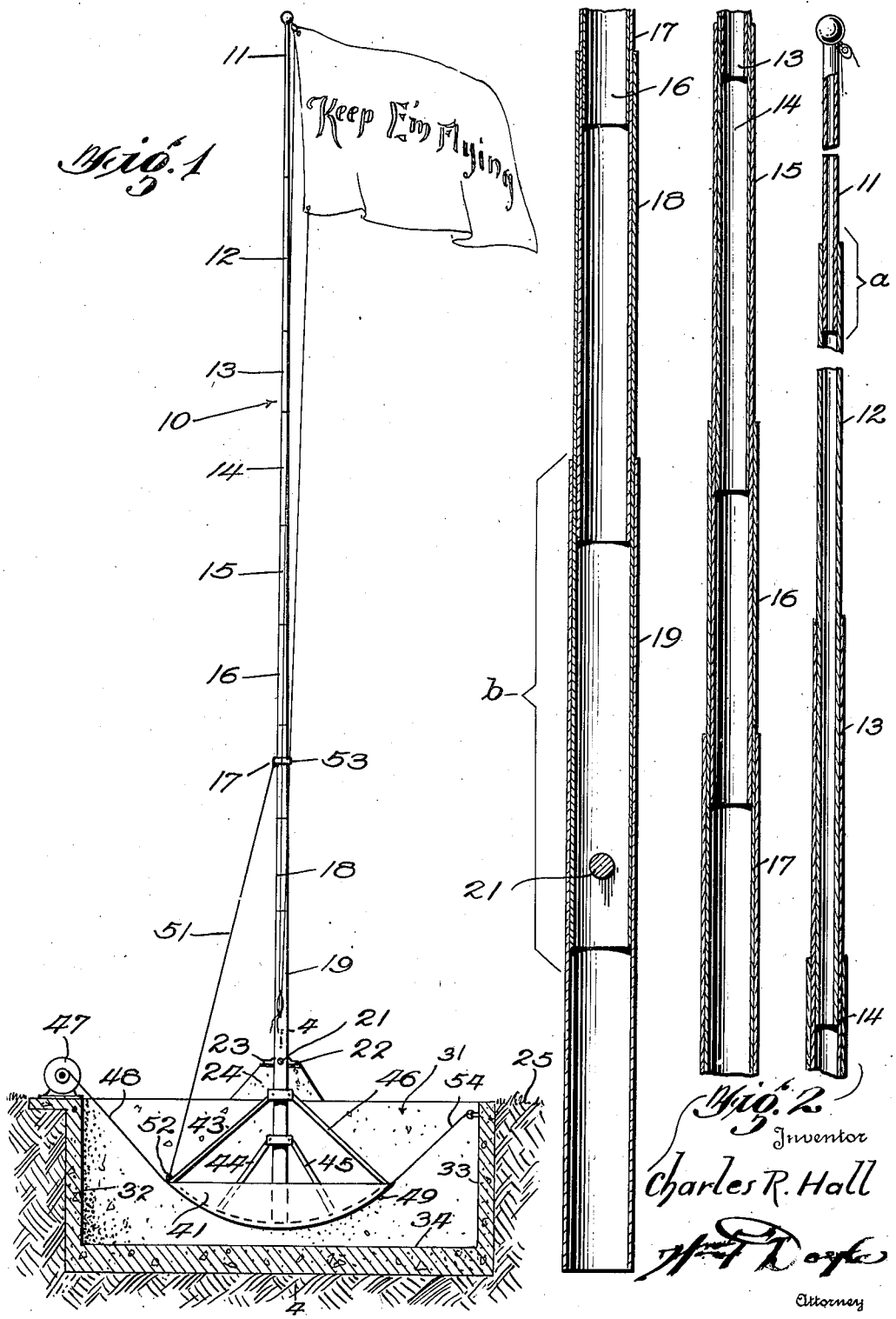
Fig. 1 is a vertical sectional elevation of a preferred embodiment of the present invention.
Fig. 2 is a sectional view of the flagstaff illustrated in Fig. 1, illustrating the preferred type of laminated wall construction.

The flagstaff 10, illustrated in the drawings, consists of a top section 11, intermediate sections 12, 13, 14, 15, 16, 17, 18, respectively, and a bottom section 19. Each section consists of a length of standard pipe of progressively larger diameter as, for example, pipe diameters of 4, 5, 6, 7, 8, 9, 10, 11 and 12 inches, respectively.

Each of these sections of pipe is telescoped within the section of larger diameter immediately below it, but the amount of overlap between each section and the next section is not constant. In fact, the overlap between each section and the next is extremely small adjacent the upper end of the pole, as indicated at A in the drawings, and each overlap becomes progressively greater until the maximum is reached. This is illustrated at B in the drawings, and is located near the lower portion of the flagstaff immediately above the pivotal mounting or trunnion. Thus, it will be seen that the upper portion of the flagstaff, that is, particularly the sections 11 and 12, constitute a single wall thickness of pipe throughout their entire length except for the small portion of overlap A between them. As contrasted with this structure, the intermediate portions of the staff at and above the pivot are overlapped to such an extent that all portions of the staff include at least two thicknesses of the pipe wall (three thicknesses at points of double overlapping), so that the flagstaff has, in effect, a laminated construction having effective wall thickness far greater than the single, normal wall thickness of commercial pipe.

If desired, the double or multiple wall thicknesses made possible by this arrangement may be continued to the extreme lower end of the flagstaff but, in order to conserve material, it is considered preferable to continue the laminated construction only to a point immediately below the pivot or trunnion 21, since the lower portion of the section 19 is not subject to as great a mechanical strain as the portions immediately above the trunnion.

The entire flagstaff 10 is mounted on a pivot or trunnion 21 which, in the preferred embodiment of the invention, constitutes a length of round, cold rolled steel bar. In order that the flagstaff, when lowered, may reach an absolute horizontal position it is essential that the trunnion 21 be provided with bearing surfaces substantially above the normal level 25 of the surrounding terrain. The base 24 includes bearing surfaces 22 and straps 23 mounted on a pair of spaced-apart reinforced concrete foundations 26 and 27, each extending upwardly and inwardly from one of the reinforced concrete walls 28 and 29, which are spaced apart a distance somewhat in excess of the distance between the portions 26 and 27 in order to provide a counterweight pit 31 sufficiently wide to give ample clearance on each side of a flagstaff counterweight to be described hereinafter.

The walls 28 and 29 are joined at their opposite ends by cross-walls 32 and 33 and are united at their lower extremities by a pit floor 34 so that the entire structure of the walls 28, 29, 32, 33 and the bottom 34 cooperate to form a longitudinally extending foundation. In order to give four-way support to the flagstaff and resist thrust in any direction, the foundations thus far described is supplemented by a pair of side buttresses 36 and 37, each of which is supported on a wide foundation slab indicated at 38 and 39, respectively.

The weight of the flagstaff is balanced at the lower extremity of the staff by a large concrete counterweight 41, preferably formed in a relatively long, narrow form with an arcuate lower surface, so that it may swing without interference in the comparatively narrow counterweight pit 31. The preferred construction of the counterweight includes a steel framework of standard channel iron including a curved lower channel 42, and radius rods 43, 44, 45 and 46, respectively. These several radius rods may be united in any convenient way as, for example, by welding to each other and to the lower extremity of the pipe section 19 of the flagstaff. The channel 42 is arranged with its side flanges extending downwardly to form a cable channel across the entire lower arcuate surface of the counterweight. The counterweight is ballasted with concrete and the lower pipe sections are filled with concrete to a point about 8 feet above the trunnions 21.

The counterweight 41 should be of a weight considerably in excess of the weight of the flagstaff above the trunnion 21 so that it will automatically overcome the resistance of mechanical or wind friction and raise the staff to a vertical position. It is then necessary to operate the winch only to cause the staff to move from its vertical to its horizontal position and the return movement can be effected by gravity alone.

Each section of the flagstaff is joined to the section immediately below it by first centering the lower end of the upper section with respect to the lower section in any suitable manner as, for example, by a plurality of screws or wedges arranged to take up any space between the external diameter of the inner section and the inside diameter of the outer section, and thereafter hammering the upper extremity of the outside section to bend it inwardly against the smaller pipe. It is then welded to the inner pipe to provide a smooth and permanent joint.

A winch 47, which may be either hand or electrically operated, is mounted on an end wall 32 of the foundation in order to lower the flagstaff. The winch cable 48 is passed downwardly and around the entire lower arcuate surface of the weight, in the cable groove between the flanges of the channel iron 42. It is secured to the opposite side of the counterweight 41 in any suitable manner as, for example, by the anchor bolt 49. By this construction, whenever the winch is operated to pull in the cable 48, the cable will gradually unwind from the cable groove in the counterweight and as it does so the counterweight will be swung upwardly in a clockwise direction around the trunnions 21 until the flagstaff assumes a horizontal position immediately above the surface of the ground. An auxiliary cable 51 is arranged to extend between any suitable anchor connection 52 at the end of the counterweight opposite the tie bolt 49 and a point on the staff somewhat above the trunnions 21 as for example, by means of a removable collar 53 secured adjacent the upper portion of the pipe section 17. The cable 51 acts as an additional support for the flagstaff during the raising and lowering operations and tends to relieve the sections 17, 18 and 19 of undue strains which would otherwise occur as the staff is raised or lowered from horizontal position. It is considered desirable to provide means for locking the flagstaff in vertical position. Preferably, it is contemplated that interlocking lugs (not shown) may be provided between the counterweight 41 and the bottom or sides of the counterweight pit, and shims arranged to adjust the staff to exact vertical position. As a possible alternative, a locking cable 54 may be anchored on the end wall 33 of the counterweight pit and may be detachably secured to the tie bolt 49 by any suitable type of hook as, for example, the hook 55.

It has been pointed out heretofore that one of the objects of the invention has been to provide a mechanical design of a flagstaff structure which might be adapted to military use and which could be constructed of materials readily available on the open market in any section of the country. This is a particularly important practical element at any time of national emergency. In times of rapid defense production it is extremely difficult, if not impossible, to obtain specially fabricated metal work either in the form of iron, steel, or wrought-iron tubes of special taper or special wall thickness, or in the form of special designs of castings or segmental gears, etc.

The degree of perfection with which the present disclosure meets this situation is well illustrated by an examination of the bill of materials used in its construction.

Bill of materials

| | | |
|---|---|---|
| 1 piece | 12-inch | pipe 20-ft. long |
| 1 piece | 11-inch | pipe 22-ft. long |
| 1 piece | 10-inch | pipe 22-ft. long |
| 1 piece | 9-inch | pipe 22-ft. long |
| 1 piece | 8-inch | pipe 22-ft. long |
| 1 piece | 7-inch | pipe 22-ft. long |
| 1 piece | 6-inch | pipe 22-ft. long |
| 1 piece | 5-inch | pipe 18-ft. long |
| 1 piece | 4-inch | pipe 16-ft. long |
| 1 | 5-ton | hoist winch and cable |
| 1250 feet | ½-inch | reinforcing bars |
| 1 piece | 4-in. x 16-ft. | channel iron |
| 2 pieces | 4-in. x 10-ft. | channel iron |
| 2 pieces | 4-in. x 8-ft. | channel iron |
| 150 sacks | | cement |
| 40 cubic yards | | sand and gravel |
| 1 piece | 3½-in. x 5-ft. | steel shaft |
| 4 pieces | ½-in. x 4½-in. x 28-in. | steel bars |
| 24 pieces | ¾-in. x 8-in. | anchor bolts with nuts and washers |

From the above, it will be seen that all of the necessary materials for the construction of the preferred embodiment of the invention illustrated may be easily purchased on the open market in any community. There is no necessity for relying on any special type of material or mechanism as, for example, any types of cranks, gears or locking mechanisms that must be specially ordered, or that may not be available on short notice in certain sections of the country. In times of preparation for national defense the production facilities of the essential industries are invariably overtaxed to an extreme extent. Usually, even the production of the standard products is curtailed and it is extremely difficult, if not impossible, to obtain any specially fabricated metal or specially cast gears. The result of this situation at the present time has been that, notwithstanding the fact that some suitable type of flagstaff has been regarded as essential in every type of military camp, extreme difficulty has been encountered in obtaining equipment of this character.

From an examination of the drawings, it will also be apparent that a flagstaff, constructed in accordance with the principles of this invention, offers a novel and simple solution for a problem confronting quartermasters in numerous military encampments throughout the country.

Further, it will be apparent from an examination of the drawings that a flagstaff constructed in accordance with the principles of this invention presents an unusually neat and attractive appearance, since the opposite sides of the foundation mounting 24 are arranged to nest closely together and give the appearance of a single tapered rectangular base, for the staff and the counterweight pit is so narrow as to be hardly visible at any appreciable distance from the staff base.

The longitudinally extending pit and the side buttresses cooperate to form a 4-way, or X-shaped, foundation of great capacity and well adapted to resist forces acting in any direction; for example, the effects of a violent wind-storm on the flagstaff. The X-shape of the supporting foundation is most clearly disclosed in Fig. 3, where it will be seen that the concrete work comprising the counterweight pit extends to the right and left from the center of the flagstaff mounting, while the buttresses 38 and 39 extend outwardly from each side of the foundation to form a foundation in the shape of a cross which has been designated in the specification as an X-shape foundation.

While I have shown and described the preferred embodiment of the invention in compliance with the patent statutes, I am aware that it is subject to numerous variations and modifications without departing from the invention spirit, and I therefore do not wish to be limited except as by the scope of the appended claims.

Having thus described my invention, what I claim as new and desire to secure by Letters Patent is:

1. A military flagstaff comprising a plurality of telescoping sections of standard commercial pipe, each section being overlapped by a section of larger diameter positioned immediately below the first-named section in the construction of the flagstaff, the arrangement being such that each lower section overlaps the section immediately above it by an overlap of progressively greater length, to the end that a flagstaff is constructed having an upper portion consisting of a single thickness of pipe, an intermediate portion consisting of a continuous, uninterrupted, plural thickness of pipe-wall to provide a laminated construction and a lower portion comprising a single thickness adjacent the lower shaft extremity.

2. In a military flagstaff, in combination, a sectional metal flagstaff, transverse trunnions secured to said flagstaff at a point spaced above the lower extremity of the staff, a pair of bearing supports, one at each end of said trunnions and spaced apart from each other a distance slightly greater than the maximum diameter of the staff to constitute a substantially unitary base for the trunnions, said bearing supports being arranged to taper downwardly and outwardly in all directions to the level of the terrain; a foundation for the bearing supports comprising a pair of longitudinally extending walls spaced apart and joined by end walls and a bottom wall to define a relatively long and narrow counterweight pit; a pair of side buttresses, one associated with each of said pit walls and terminating at their upper extremity in the aforementioned bearing supports; the said longitudinal walls and side buttresses being arranged to cooperate with each other and form a substantially X-shaped supporting foundation; and a counterweight at the lower extremity of the staff, the said counterweight consisting of a relatively long arcuate channel iron arranged with its flanges downwardly to form a cable channel, a plurality of radius rods extending from the remote portions of said channel to a point of the flagstaff below the trunnion mounting, and a concrete counterweight of relatively long and narrow shape secured to the lower extremity of the shaft and adapted to move in the counterweight pit.

3. A military flagstaff comprising a plurality of telescoping sections of standard commercial pipe, each section being overlapped by a section of larger diameter positioned immediately below the first-named section in the construction of the flagstaff, the arrangement being such that each lower section overlaps the section immediately above it by an overlap of progressively greater length to the end that a flagstaff is constructed having a small diameter portion consisting of a single thickness of pipe and a larger diameter portion adjacent the staff mounting consisting of a continuous, uninterrupted plural thickness of pipe-wall to provide a laminated construction.

4. In a military flagstaff, in combination, a sectional metal flagstaff, transverse trunnions secured to said flagstaff at a point spaced apart from the lower extremity of the staff, a pair of bearing supports one at each end of said trunnions and spaced apart from each other a distance slightly greater than the maximum diameter of the staff to constitute a substantially unitary base for the trunnions, said bearing supports being arranged to taper downwardly and outwardly in all directions to the level of the terrain, a foundation for the bearing supports comprising a pair of longitudinally extending walls spaced apart and joined by end walls and a bottom wall to define a relatively long and narrow counterweight pit of a width greater than the distance between the aforementioned bearing supports and a pair of side buttresses, one associated with each of said longitudinal pit walls and terminating at their upper extremity in the aforementioned bearing supports; the said longitudinal walls and side buttresses being arranged to cooperate with each other and form a substantially X-shaped supporting foundation.

5. A military flagstaff comprising a plurality of telescoping sections of standard commercial pipe, each section being overlapped by a section of larger diameter positioned immediately below the first-named section in the construction of the flagstaff, the arrangement being such that the lower section overlaps the section immediately above it by an overlap of greater length than the overlap of the upper sections, to the end that a flagstaff is constructed having an upper portion consisting of a single thickness of pipe and a portion adjacent the staff mounting consisting of a continuous, uninterrupted, plural thickness of pipe-wall to provide a laminated staff construction.

6. In a military flagstaff, in combination, a sectional metal flagstaff comprising a plurality of telescoping sections of standard commercial pipe, each section being overlapped by a section of larger diameter positioned immediately below the first-named section in the construction of the flagstaff, the arrangement being such that each lower section overlaps the section immediately above it by an overlap of progressively greater length, to the end that a flagstaff is constructed having an upper portion consisting of a single thickness of pipe, and a portion adjacent the staff mounting consisting of a continuous, uninterrupted, plural thickness of pipe wall to provide a laminated construction from the pipe mounting a portion of the distance to the upper extremity of the shaft and a single thickness portion at and adjacent the upper extremity of the staff; transverse trunnions secured to said flagstaff at a point spaced apart from the lower extremity of the staff, a pair of bearing supports one at each end of said trunnions and spaced apart from each other a distance slightly greater than the maximum diameter of the staff to constitute a substantially unitary base for the trunnions, said bearing supports being arranged to taper downwardly and outwardly in all directions to the level of the terrain; a foundation for the bearing supports comprising a pair of longitudinally extending walls, end walls and a bottom wall uniting said first walls to define a relatively long and narrow counterweight pit of a width greater than the distance between the aforementioned bearing supports; a pair of side buttresses, one associated with each of said pit walls and terminating at their upper extremity in the aforementioned bearing supports, the said longitudinal walls and side buttresses being arranged to cooperate with each other and form a substantially X-shaped supporting foundation; and a counterweight at the lower extremity of the staff, the said counterweight consisting of a relatively long arcuate channel iron arranged with its flanges downwardly to form a cable channel; a plurality of radius rods extending from the remote portions of said channel to a point of the flagstaff below the trunnion mounting and a concrete counterweight of relatively long and narrow shape secured to the lower extremity of the shaft and adapted to move in the counterweight pit.

CHAS. R. HALL.